United States Patent
Zhou et al.

(10) Patent No.: US 7,868,885 B2
(45) Date of Patent: Jan. 11, 2011

(54) DIRECT MANIPULATION OF SUBDIVISION SURFACES USING A GRAPHICS PROCESSING UNIT

(75) Inventors: Kun Zhou, Beijing (CN); Heung-Yeung Shum, Bellevue, WA (US); Baining Guo, Beijing (CN); Xin Huang, Beijing (CN); Weiwei Xu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 743 days.

(21) Appl. No.: 11/767,427

(22) Filed: Jun. 22, 2007

(65) Prior Publication Data

US 2008/0316202 A1 Dec. 25, 2008

(51) Int. Cl.
*G06T 15/00* (2006.01)

(52) U.S. Cl. .................... 345/419; 345/420; 345/421; 345/423; 345/427; 345/581; 345/582; 345/440; 382/285

(58) Field of Classification Search ............... 345/419, 345/421, 423, 427, 428, 581, 582, 442, 420; 382/285
See application file for complete search history.

(56) References Cited

U.S. PATENT DOCUMENTS

| | | | |
|---|---|---|---|
| 4,821,214 A | 4/1989 | Sederberg | |
| 4,885,702 A | 12/1989 | Ohba | |
| 6,037,949 A * | 3/2000 | DeRose et al. | 345/582 |
| 6,806,874 B2 | 10/2004 | Biermann et al. | |
| 6,943,790 B2 * | 9/2005 | Taubin | 345/420 |
| 6,987,511 B2 * | 1/2006 | Taubin | 345/420 |
| 7,095,879 B2 | 8/2006 | Yan et al. | |
| 7,196,702 B1 | 3/2007 | Lee et al. | |
| 7,236,170 B2 * | 6/2007 | Sepulveda | 345/423 |
| 7,528,832 B2 * | 5/2009 | Smith et al. | 345/423 |
| 7,589,720 B2 * | 9/2009 | Zhou et al. | 345/423 |
| 2005/0168463 A1 | 8/2005 | Sepulveda | |
| 2005/0219250 A1 | 10/2005 | Sepulveda | |
| 2006/0013505 A1 * | 1/2006 | Yau et al. | 382/285 |
| 2006/0017723 A1 * | 1/2006 | Baran et al. | 345/419 |
| 2006/0022990 A1 | 2/2006 | Mech | |
| 2006/0274070 A1 | 12/2006 | Herman et al. | |

FOREIGN PATENT DOCUMENTS

WO WO-0108102 2/2001

OTHER PUBLICATIONS

Marinov et al. "GPU-Based Multiresolution Deformation Using Approximate Normal Field Reconstruction", 2007 ACM.*
Shi et al. "A Fast Multigrid Algorithm for Mesh Deformation", 2006 ACM, pp. 1108-1117.*

(Continued)

*Primary Examiner*—Kimbinh T Nguyen
(74) *Attorney, Agent, or Firm*—Perkins Coie LLP

(57) ABSTRACT

A graphics system allows for manipulation of a detail mesh for a subdivision surface. To deform the subdivision surface, the graphics system generates a corresponding deformed control mesh by attempting to satisfy both position constraints of the manipulation and Laplacian constraints for the detail mesh. After the deformed control mesh is generated, the deformed detail mesh can be generated by applying a subdivision function to the deformed control mesh to generate a deformed smooth mesh and then applying detail information to the deformed smooth mesh.

19 Claims, 7 Drawing Sheets

OTHER PUBLICATIONS

Bolz, J. et al., "Sparse Matrix Solvers on the GPU: Conjugate Gradients and Multigrid," ACM Trans. 2003, Graph. 22, 3, pp. 917-924.

Bolz, J. et al., "Evaluation of Subdivision Surfaces on Programmable Graphics Hardware," 2004, 4 pp., http://www.multires.caltech.edu/pubs/GPUSubD.pdf [last accessed Apr. 30, 2009].

Cohen, J. et al., "Simplification Envelopes," SIGGRAPH 96 Conference Proceedings, pp. 119-128, 1996.

Derose, T. et al., "Subdivision Surfaces in Character Animation," In SIGGRAPH 98, 1998, Conference Proceedings, pp. 85-94.

Desbrun, M. et al., "Implicit Fairing of Irregular Meshes Using Diffusion and Curvature Flow," In SIGGRAPH 99 Conference Proceedings, 1999, pp. 317-324.

Hsu, W. M. et al., "Direct Manipulation of Free-Form Deformations," In SIGGRAPH 92 Conference Proceedings, 1992, pp. 177-184.

Huang, J. et al., "Subspace Gradient Domain Mesh Deformation," ACM Trans. Graph. 25, 3, 2006, pp. 1126-1134.

International Search Report and Written Opinion; International Patent Application No. PCT/US2008/067789; Filed: Jun. 20, 2008; Applicant: Microsoft Corporation; Mailed on Nov. 20, 2008.

Kruger, J. et al., "Linear Algebra Operators for GPU Implementation of Numerical Algorithms," ACM Trans. Graph. 22, 3, 2003, pp. 908-916.

Lee, A. et al., "Displaced Subdivision Surfaces," In SIGGRAPH 2000 Conference Proceedings, pp. 85-94.

Loop, C. T., "Smooth Subdivision Surfaces Based on Triangles," Master's Thesis, Deartment of Mathematics University of Utah. 1987.

Porumbescu, S. D. et al., "Shell Maps," ACM Trans. 2005, Graph. 23, 3, pp. 626-633.

Shiue, L.-J. et al., "A Realtime GPU Subdivision Kernel," ACM Trans. Graph. 24, 3, 2005, pp. 1010-1015.

Sorkine, O. et al., "Laplacian surface editing," In Eurographics Symposium on Geometry Processing, 2004, pp. 175-184.

Steihaug, T., "An Inexact Gauss-Newton Approach to Mildly Nonlinear Problems," Tech. rep., Dept. Of Mathematics, University of Linkoping, 1995, pages.

Welch, W. et al, "Variational Surface Modeling," In Proceedings of SIGGRAPH 92, pp. 157-166.

Yu, Y. et al., "Mesh Editing with Poisson-based Gradient Field Manipulation," ACM Trans., 2004, Graph. 23, 3, pp. 644-651.

Zhou, K. et al., "Large Mesh Deformation Using the Volumetric Graph Laplacian," ACM Trans. Graph., 2005, 24, 3, pp. 496-503.

Zorin, D. et al., "Interactive Multiresolution Mesh Editing," In SIGGRAPH 97 Conference Proceedings, pp. 259-268.

Zorin, D. et al., "Subdivision for Modeling and Animation," Course notes of SIGGRAPH 2000, 194 pages.

* cited by examiner

DIRECT MANIPULATION OF SUBDIVISION SURFACES USING A GRAPHICS PROCESSING UNIT

BACKGROUND

Computer-generated graphics techniques for manipulation of three-dimensional objects are being used widely by movie production systems, commercial modelers, and game engines. Computer-generated techniques take a three-dimensional representation of an object and generate a two-dimensional rendering of the object in different positions. These objects are typically represented by a mesh or detail mesh of polygons that defines the surface of the object. A detail mesh can be represented as a set of vertices and connecting edges that define the surface of the object. A triangular mesh M may be represented as (K,V), where K represents the connecting edges and $V=(v_1, \ldots, v_m)^T$ represents the vector of m vertices $v_i \in R^3$ that each represent a point on the surface of the object.

To generate an animation, an animator typically manipulates the surface of the detail mesh to indicate a new position for target points on the surface of the object being animated. For example, if the object is a person, an animator may animate the person raising their hand by moving the tip of a finger above the person's head. The animator may in general specify a sequence of target positions for points of the person's body to represent an animation of the person. A goal of the computer-generated graphics techniques is to recalculate a new mesh based on the target points so that an accurate two-dimensional representation of the object as it moves can be generated in real time.

It is tedious and impractical to manually specify target positions for all vertices of the detail mesh. A recent mesh deformation technique, referred to as gradient domain mesh deformation or Laplacian deformation, casts mesh deformation as an energy minimization problem that allows more global and complex deformation. Typically, the energy functions used in these techniques contain terms to preserve detail (often through Laplacian coordinates), as well as position-constraint terms to allow for direct manipulation. One energy function is represented as follows:

$$\min_{V_d}(\|LV_d - \delta(V_d)\|^2 + \|CV_d - U\|^2) \quad (1)$$

where L represents the Laplacian operator matrix of $M_d$, $LV_d$ represents Laplacian coordinates of the detail mesh before deformation, $\delta(V_d)$ represents the Laplacian coordinates of the vertices $V_d$ of the detail mesh after deformation, C represents a positional constraints matrix, and U represents the target positions of the constrained vertices (i.e., vertices under direct manipulation). The left side of the minimization function seeks to minimize the before and after Laplacian coordinates. A Laplacian coordinate represents an average distance between a vertex of the detail mesh and its neighbor vertices. The right side seeks to minimize the difference between the desired position of the constrained vertices and the actual position of the constrained vertices. The left side tends to preserve details of the surface and the right side tends to preserve position constraints. The gradient mesh domain techniques tend to distribute the error over the entire mesh resulting in a high-quality deformation.

Since the storing of such detail meshes may require a vast amount of storage, computer-generated graphics techniques have used subdivision surfaces to reduce the required storage. A subdivision surface is a detail mesh that is generated from a control mesh with much fewer vertices than the detail mesh by subdividing the control mesh according to a subdivision detail function. For example, if the polygons of the control mesh are triangles, then each triangle can be split into four new triangles by adding a vertex to each edge of the triangle. This process of subdividing the mesh can continue until the desired level of subdivision is attained. A displacement map or geometric texture can then be applied to the smooth subdivision surface to get the detail mesh. To represent an object, a computer graphics technique need only store the control mesh and the subdivision detail function, rather than the detail mesh.

To generate an animation for an object represented by a subdivision surface, an animator usually manipulates the vertices of the control mesh. A computer-generated graphics technique then calculates the new vertices for the deformed control mesh using, for example, a Laplacian deformation technique. The technique can then apply the subdivision detail function to the deformed control mesh to generate a deformed detail mesh, which can then be rendered.

Typical techniques for generating an animation for an object represented by a subdivision surface have several disadvantages. For example, these techniques require the animator to manipulate the object using the control mesh, rather using the detail mesh. Such manipulation of the control mesh is not intuitive to an animator because the animator wants to view and manipulate the detail mesh as is done with the deformation of detail meshes. As another example, these techniques do not preserve the surface details of the detail mesh.

SUMMARY

A graphics system allows for manipulation of a detail mesh for a subdivision surface. To deform the subdivision surface, the graphics system generates a corresponding deformed control mesh by attempting to satisfy both position constraints of the manipulation and Laplacian constraints for the detail mesh. After the deformed control mesh is generated, the deformed detail mesh can be generated by applying a subdivision function to the deformed control mesh to generate a deformed smooth mesh and then applying detail information to the deformed smooth mesh. The graphics system may offload most of the processing needed to generate the deformed control mesh from a central processing unit ("CPU") of a computer to a graphics processing unit ("GPU") of the computer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
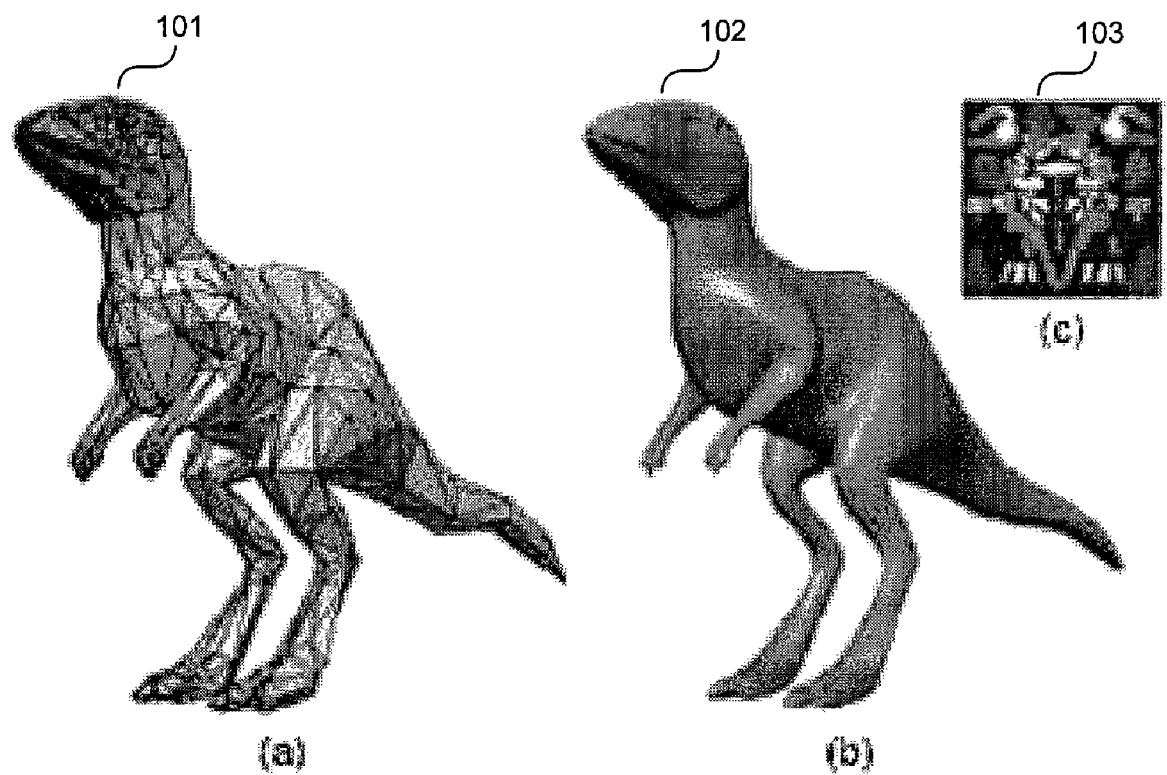
FIG. 1 illustrates a control mesh, a smooth mesh, and a displacement map representing a dinosaur.

Deformation of a three-dimensional object by direct manipulation of subdivision surfaces with detail information is provided. In some embodiments, a graphics system allows for manipulation of a detail mesh for a subdivision surface and then generates a corresponding deformed control mesh by attempting to satisfy both position constraints of the manipulation and Laplacian constraint for the detail mesh. After the deformed control mesh is generated, the deformed detail mesh can be generated by applying the subdivision detail function to the deformed control mesh. In this way, an animator can manipulated the detail mesh of a subdivision surface directly and the detail of the detail mesh can be preserved. Moreover, as described below in more detail, much of the processing needed to generate the deformed control mesh can be offloaded from the central processing unit ("CPU") of a computer to a graphics processing unit ("GPU") of the computer.

In some embodiment, the graphics system provides a shell deformation solver that converges on a solution for a deformed control mesh by iteratively generating a control mesh until an energy function is minimized. The graphics system at each iteration generates a smooth mesh based on the control mesh from the previous iteration, generates a new control mesh based on the smooth mesh and position constraints of the manipulation, generates a new smooth mesh from the control mesh, generates a new detail mesh by applying detail information to the smooth mesh, and then generates a new control mesh from the detail mesh. At each iteration, the shell deformation solver starts with the control mesh updated from the previous iteration. The shell deformation solver effectively projects the subdivision detail information of the surface to the control mesh for the next iteration. The smooth mesh and the detail mesh form a shell surrounding a solution. The shell deformation solver alternately optimizes the smooth mesh and the detail mesh. The optimized smooth mesh represents a good initial estimate of the solution and allows for rapid convergence on a solution. In addition, the shell deformation solver may be implemented in a GPU. Since the shell deformation solver uses local operations, it can take advantage of parallel execution streams and graphics operations of a GPU.

The shell deformation solver ensures that the deformed surface is a subdivision surface so that a control mesh can be generated from the detail mesh for the next iteration. The shell deformation solver may the energy function to be minimized as follows:

$$\min_{V_c}(\|Lf(V_c) - \hat{\delta}(f(V_c))\|^2 + \|Cf(V_c) - U\|^2) \quad (2)$$

where $V_d$ in Equation 1 has been replaced with $f(V_c)$. The function $f$ is a subdivision detail function that is based on how the control mesh is subdivided into the smooth mesh and how the detail information is applied to the smooth mesh. If there is no detail information, then the subdivision detail function is linear. However, the subdivision detail function is generally highly nonlinear when detail information is applied.

When no detail information is provided, the graphics system may perform the deformation without using the shell deformation solver, because the subdivision detail function is linear. The graphics system represents the vertices of the smooth mesh as follows:

$$V_b = S_l S_{l-1} \ldots S_1 V_c = S_b V_c \quad (3)$$

where $V_c$ and $V_b$ represent the vertices of the control mesh and the smooth mesh, respectively, and $S_i$ represents the ith application of the subdivision rules to the control mesh. The subdivision matrix for $M_c \rightarrow M_b$ is $S_b = S_l S_{l-1} \ldots S_1$. The subdivision detail function is thus represented as $f(V_c) = S_b V_c$ and is linear. Since the subdivision detail function is linear, Equation 2 can be represented by the following:

$$\min_{V_c} \|AV_c - b(V_c)\|^2, \text{ where} \quad (4)$$

$$A = \begin{pmatrix} L_b S_b \\ C S_b \end{pmatrix}, b(V_c) = \begin{pmatrix} \hat{\delta}(S_b V_c) \\ U \end{pmatrix}$$

where $L_b$ represents the Laplacian operator matrix of the smooth mesh. Since $\hat{\delta}$ is nonlinear, $b(V_c)$ is a nonlinear function of $V_c$. The graphics system can solve Equation 4 using an inexact Gauss-Newton method as follows:

$$\min_{V_c^{k+1}} \|AV_c^{k+1} - b(V_c^k)\|^2 \quad (5)$$

At each iteration $b(V_c^k)$ is used to solve the least squares problem as follows:

$$V_c^{k+1} = (A^T A)^{-1} A^T b(V_c^k) \quad (6)$$

(See Huang, J., Shi, X., Liu, X., Zhou, K., Wei, L.-Y., Teng, S.-H., Bao, H., Guo, B., and Shum, H.-Y., "Subspace gradient domain mesh deformation," *ACM Trans. Graph.* 2006, 25, 1126-1134; and Steihaug, T., "An Inexact Gauss-Newton Approach to Mildly Nonlinear Problems," Tech. Rep., Dept. of Mathematics, University of Linkoping, 1995.)

The inexact Gauss-Newton method for base surface deformation uses a linearization as represented by the following:

$$AV_c^{k+1} - b(V_c^{k+1}) \approx AV_c^k - b(V_c^k) + (A - J_b(V_c^k))(V_c^{k+1} - V_c^k) \quad (7)$$
$$\approx AV_c^k - b(V_c^k) + A(V_c^{k+1} - V_c^k)$$
$$= AV_c^{k+1} - b(V_c^k)$$

where $J_b$ represents the Jacobian of b. This approximation is accurate when either $\|J_b(V_c^k)\| \ll \|A\|$ or the step size $\|V_c^{k+1} - V_c^k\|$ is very small. Although the step size is not always small because large step sizes are needed for fast convergence, $\|J_b(V_c^k)\| \ll \|A\|$ is satisfied. It is satisfied because the subdivision detail function is linear and the nonlinearity of $b(V_c)$ is caused by the nonlinear Laplacian coordinates, which are only moderately nonlinear.

Because the deformation energy function is highly nonlinear when detail information is added to the subdivision detail function, the linearization of Equation 7 cannot be effectively used to minimize the deformation energy function. As a result, the graphics system uses the shell deformation solver when detail information is used.

When the detail information is represented as a displacement map, the vertices of the detail mesh can be represented as follows:

$$V_d = V_b + HN_b \tag{8}$$

where H represents a diagonal matrix of displacements $h_i$ of vertices i along the normals $n_i$ and $N_b$ represents $N_b = (n_1, \ldots, n_m)^T$. Equation 8 can be represented in terms of $V_c$ by the following:

$$V_d = f(V_c) = S_b V_c + HN_b \tag{9}$$

The solution to Equation 9 can be represented as follows:

$$\min_{V_c} \|DV_c - d(V_c)\|^2, \tag{10}$$

$$D = \begin{pmatrix} L_d S_b \\ CS_b \end{pmatrix}, d(V_c) = \begin{pmatrix} \hat{\delta}(f(V_c)) - L_d HN_b \\ U - CHN_b \end{pmatrix}$$

where $L_d$ represents the Laplacian operator matrix of detail mesh $M_d$.

The shell deformation solver provides an iterative solution to Equation 10. At each iteration, the shell deformation solver optimizes $M_b$ and $M_d$. Each iteration starts out with deforming the inner boundary of the shell $M_b$ by solving Equation 5 with inferred position constraints on $M_b$. The inferred position constraints are derived from U, which are the constraints on $M_d$. After deforming the smooth mesh $M_b$, the shell deformation solver calculates the Laplacian coordinates and displacement normals using Equation 10. The shell deformation solver then calculates the deformation of the detail mesh.

At each iteration k, the shell deformation solver calculates an initial guess of the control mesh vertices using Equation 6 as follows:

$$V_c^{k+\frac{1}{2}} = (A^T A)^{-1} A^T b'(V_c^k) \tag{11}$$

where $V_c^{k+1}$ represents the control mesh vertices and $$b'(V_c^k) = \begin{pmatrix} \hat{\delta}(S_b V_c) \\ U' \end{pmatrix}$$

with U' representing the inferred position constraints. The shell deformation solver may infer the position constraints from the original position constraints U. For example, a vertex of $M_b$ is constrained to move the same amount as the corresponding vertex of $M_d$.

To calculate the deformation of $M_d$ for the current iteration, the shell deformation solver solves the following:

$$\min_{V_c^{k+1}} \|DV_c^{k+1} - b(V_c^{k+\frac{1}{2}})\|^2 \tag{12}$$

where $V_c^{k+1}$ represents the vertices of the control mesh. The result is the following:

$$V_c^{k+1} = (D^T D)^{-1} D^T d(V_c^{k+\frac{1}{2}}) \tag{13}$$

The shell deformation solver can also solve deformations when the detail information is a geometric texture. The geometric texture can be mapped to a shell space over the smooth mesh $M_b$. (See Porumbescu, S. D., Budge, B., Feng, L., and Joy, K. I., "Shell Maps," *ACM Trans. Graph.*, Vol. 24, Issue 3, pp. 626-633, 2005.) An offset mesh $M_t$, which has the same number of vertices and the same mesh connectivity as $M_b$, can be created using an envelope generation algorithm. (See Cohen, J., Varshney, A., Manocha, D., Turk, G., Weber, H., Agarwal, P., Brooks, F., and Wright, W., "Simplification Envelopes," *SIGGRAPH 96 Conference Proceedings*, pp. 119-128, 1996.) As with displacement mapping, each vertex $v_i$ of $M_b$ is moved by a distance $h_i$ along the normal direction at $v_i$. Thus, the vertex positions of the offset mesh $M_t$ can be represented as follows:

$$V_t = V_b + HN_b \tag{14}$$

A shell map may be defined by decomposing both the shell space (the space between $M_b$ and $M_t$) and the texture space into two sets of corresponding tetrahedra. The shell map is defined by the barycentric coordinates of the corresponding tetrahedra. Given a point in the texture space, the tetrahedron it belongs to can be located and its barycentric coordinates computed. Its corresponding point in the shell space is located in the corresponding tetrahedron with the same barycentric coordinates. With the shell map, the vertex positions of the detailed mesh $M_d$ can be represented as a linear combination of $V_b$ and $V_t$ as follows:

$$V_d = (W_b W_t)\begin{pmatrix} V_b \\ V_t \end{pmatrix} = W_b V_b + W_t V_t = (W_b + W_t)V_b + W_t HN_b \tag{15}$$

where $(W_b W_t)$ is the matrix of barycentric coordinates. When $V_b$ is replaced with $S_b V_c$, Equation 15 can be represented as follows:

$$V_d = f(V_c) = (W_b + W_t)S_b V_c + W_t HN_b \tag{16}$$

The detail mesh $M_d$ can be deformed by solving Equation 10 with the new matrix D and nonlinear function $d(V_c)$ as represented by the following:

$$D = \begin{pmatrix} L_d(W_b + W_t)S_b \\ C(W_b + W_t)S_b \end{pmatrix}, \tag{17}$$

$$d(V_c) = \begin{pmatrix} \hat{\delta}(f(V_c)) - L_d W_t HN_b \\ U - CW_t HN_b \end{pmatrix}$$

The shell deformation solver may compute the Laplacian operator matrix using a cotangent form. (See Desbrun, M., Meyer, M., Schroder, P., and Barr, A. H., "Implicit Fairing of Irregular Meshes Using Diffusion and Curvature Flow," *SIGGRAPH 99 Conference Proceedings*, pp. 317-324, 1999.) The shell deformation solver may compute the Laplacian coordinates using a rotation invariant representation. (See Huang, J., Shi, X., Liu, X., Zhou, K., Wei, L.-Y., Teng, S.-H., Bao, H., Guo, B., and Shum, H.-Y., "Subspace Gradient Domain Mesh Deformation," *ACM Trans. Graph.*, Vol. 25, Issue 3, pp. 1126-1134, 2006.)

To implement the shell deformation solver using a GPU, the graphics system can precompute $A^T$ and $(A^T A)^{-1}$ of Equation 6 using the central processing unit ("CPU") and store them in the GPU as two textures. Alternatively, the graphics system can precompute $(A^T A)^{-1} A^T$ and store it as a single texture. To calculate $b(V_c^k)$, $\hat{\delta}(S_b V_c^k)$, and U need to be calculated. To calculate $\hat{\delta}(S_b V_c^k)$, the smooth mesh vertices $V_b^{k=S_b V_c^k}$ are calculated through subdivision, which can be efficiently computed using a subdivision kernel. (See Shiue, L.-J., Jones, I., and Peters, J., "A Real-Time GPU Subdivision Kernel," *ACM Trans. Graph.*, Vol. 24, Issue 3, pp. 1010-1015, 2005.) The graphics system may preprocess the control mesh into a set of fragment meshes. Fragment meshes that share the same lookup table may be placed into a group and stored as a two-dimensional texture using spiral enumeration. Each fragment mesh in a group is mapped to a row in the two-dimensional texture. In the fragment shader, the lookup table is used to fill the subdivision stencil for each row. The subdivision results (i.e., vertex position and normal) are either stored as two-dimensional textures for subsequent processing or sent to pixel buffer objects ("PBOs") for rendering. Once vbk is calculated, $\hat{\delta}(V_b^k)$ can be calculated using the rotational-invariant representation as described above. The final evaluation of $V_c^{k+1} = (A^T A)^{-1} A^T b(V_b^k)$ is performed using a sparse matrix vector multiplication between $A^T$ and $b(V_b^k)$ followed by a dense matrix vector multiplication between $(A^T A)^{-1}$ and $A^T b(V_b^k)$. (See Bolz, J., Farmer, I., Grinspun, E., and Schröder, P., "Sparse Matrix Solvers on the GPU: Conjugate Gradients and Multigrid," *ACM Trans. Graph.*, Vol. 22, Issue 3, pp. 917-924, 2003; and Krüger, J., and Westermann, R., "Linear Algebra Operators for GPU Implementation of Numerical Algorithms," *ACM Trans. Graph.*, Vol. 22, Issue 3, pp. 908-916, 2003.)

FIG. 1 illustrates a control mesh, a smooth mesh, and a displacement map representing a dinosaur. The control mesh 101 comprises triangles that are represented by the three-dimensional position of vertices of the triangles along with information describing the vertices that are connected by the edges of the triangles. Through subdivision, the smooth mesh 102 can be generated. The displacement map 103 indicates the surface displacement to be applied to the smooth mesh to generate the detail mesh.

Figure 2:
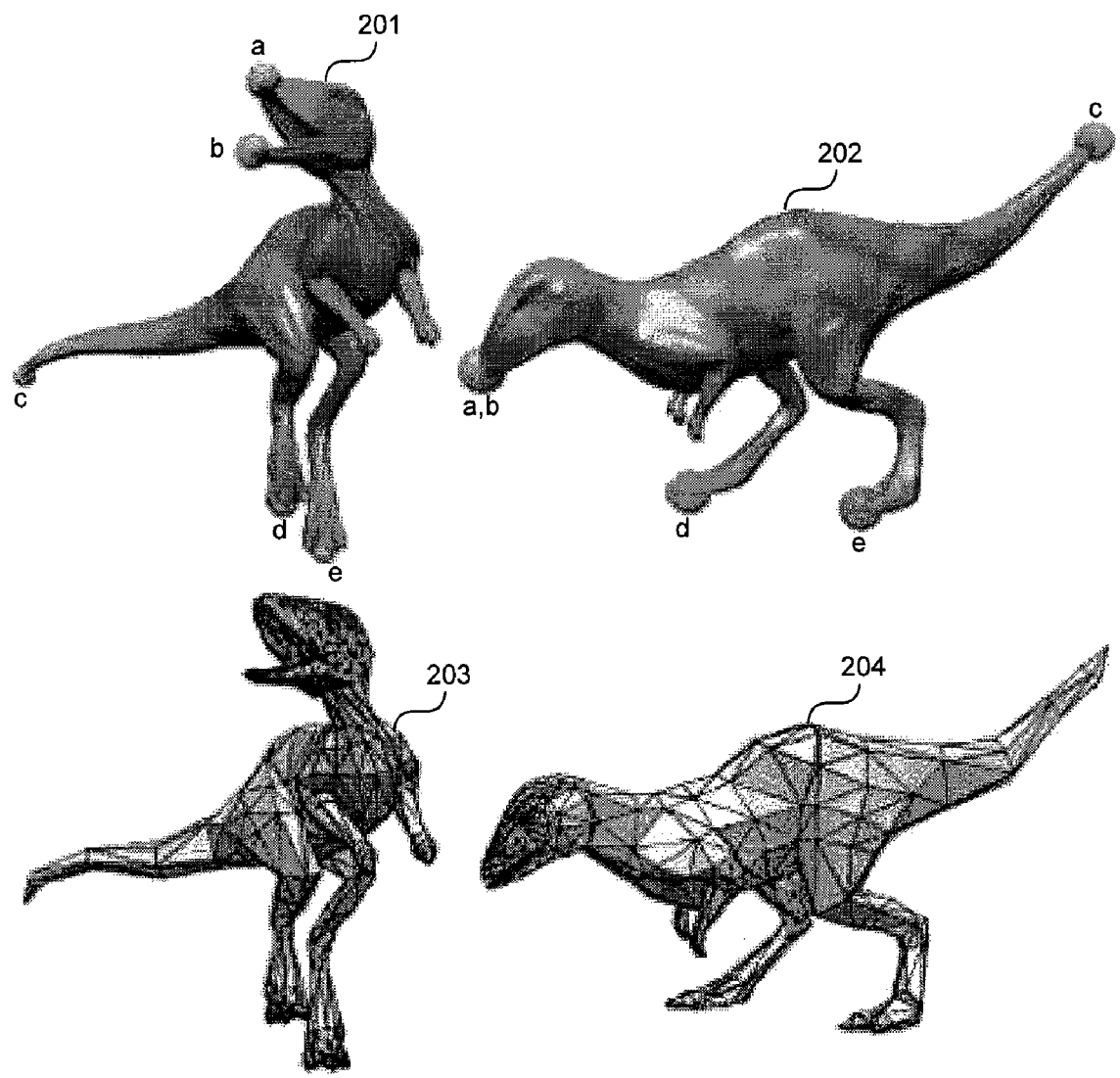
FIG. 2 illustrates surface deformation via direct manipulation.

FIG. 2 illustrates surface deformation via direct manipulation. Dinosaurs 201 and 202 illustrate how a user can deform a detail mesh by moving freely selected surface points 201*a*-201*e* and 202*a*-202*e*. Dinosaurs 203 and 204 illustrate the corresponding control mesh that has been generated by the shell deformation solver.

Figure 3:
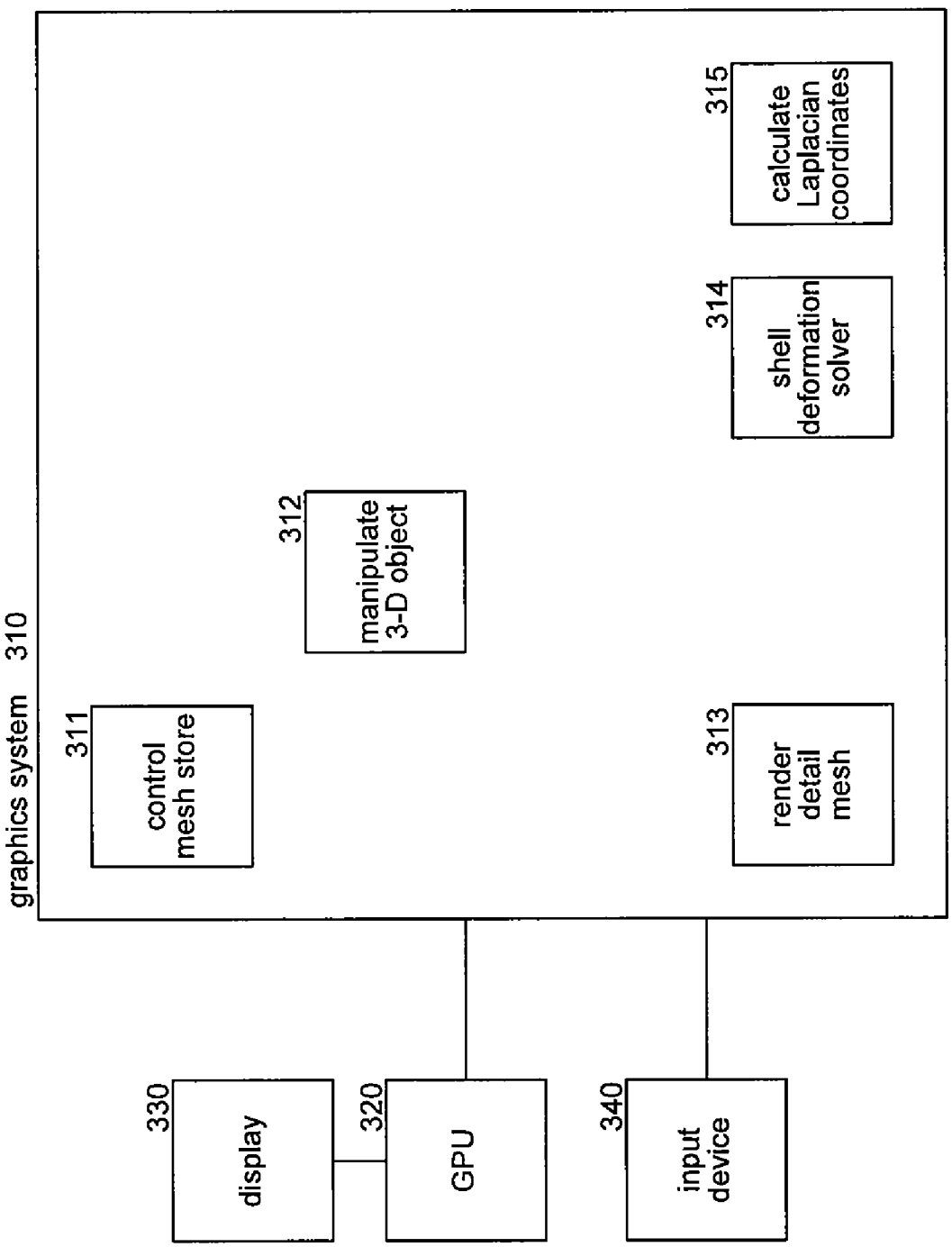
FIG. 3 is a block diagram that illustrates components of the graphics system in some embodiments.

FIG. 3 is a block diagram that illustrates components of the graphics system in some embodiments. The graphics system 310 may include a control mesh store 311, a manipulate three-dimensional object component 312, a render detail mesh component 313, a shell deformation solver component 314, and a calculate Laplacian coordinates component 315. The graphics system may be connected to a display 330 via a graphics processing unit 320. In addition, the graphics system may input manipulations of an object via an input device 340. The control mesh store stores the initial control mesh representing an object. The manipulate three-dimensional object component inputs target positions for vertices of a detailed mesh and generates a deformed control mesh from which the object can be rendered. The render detail mesh component inputs a detailed mesh and renders it on the display device. The calculate Laplacian coordinates component calculates the Laplacian coordinates using a rotation invariant representation as described above. Much of the shell deformation solver component processing may be offloaded from the CPU of the computing device on which the graphics system is implemented onto the graphics processing unit as described above. The graphics processing unit may be an NVidia 8800GTX graphics card.

The computing device on which the graphics system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the graphics system may be implemented in and used by various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The graphics system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 4:
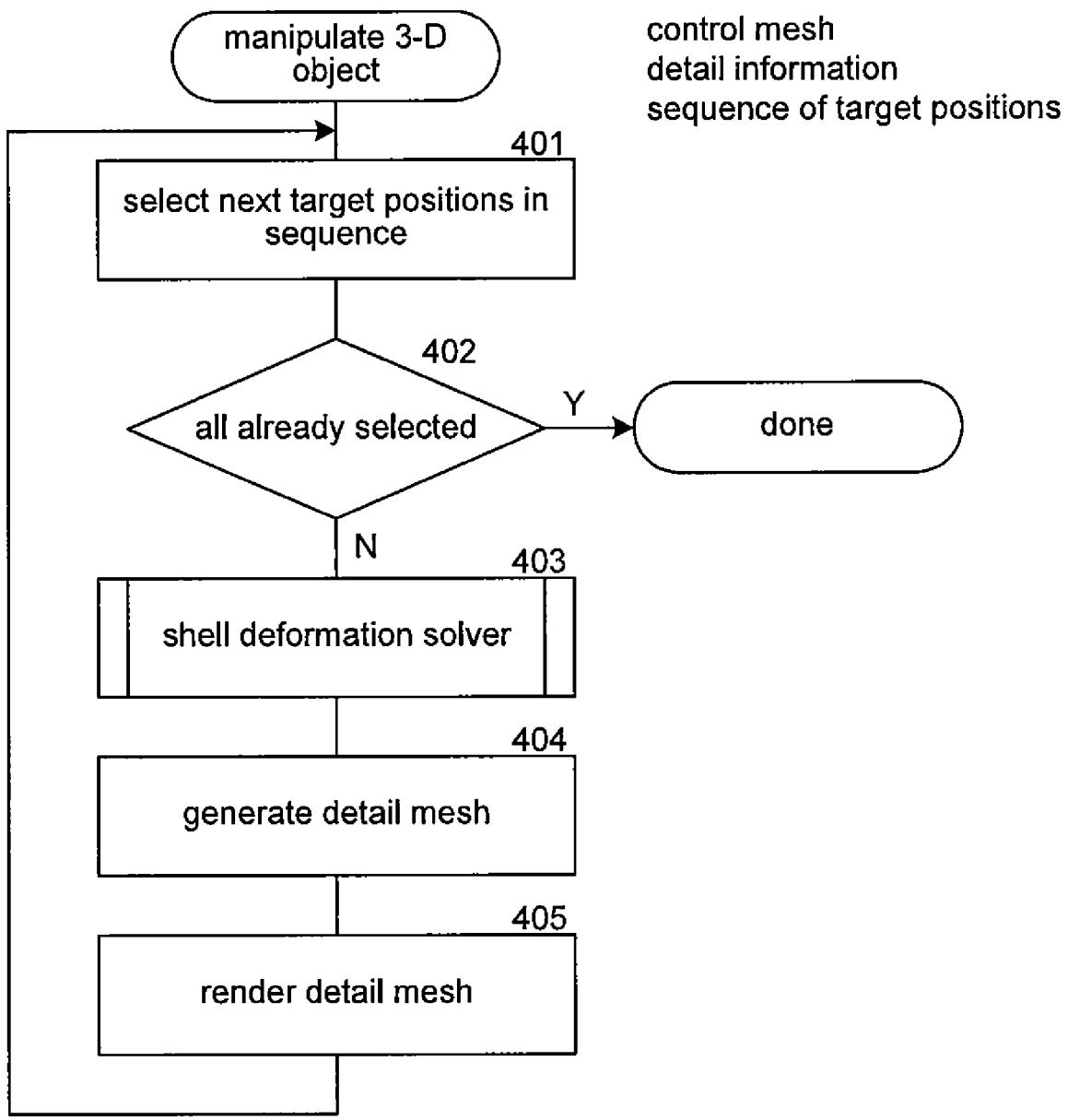
FIG. 4 is a flow diagram that illustrates the overall processing of a manipulate three-dimensional object component of the graphics system in some embodiments.

FIG. 4 is a flow diagram that illustrates the overall processing of a manipulate three-dimensional object component of the graphics system in some embodiments. The component may be provided with a control mesh, detail information, and a sequence of sets of target points and generates a deformed control mesh using a shell deformation solver as described above according to a sequence of target positions and renders the detail mesh generated from the deformed smooth mesh. The target positions may be generated by an animator. In block 401, the component selects the next set of target positions in the sequence. In decision block 402, if all the sets of sequences in order have been selected, then the component completes, else the component continues at block 403. In block 403, the component invokes the shell deformation solver component to generate a deformed control mesh based on the detail information and the selected set of target positions. In block 404, the component generates a detail mesh from the generated deformed control mesh. In block 405, the component renders the detail mesh and loops to block 401 to select the next set of target positions sequence.

Figure 5:
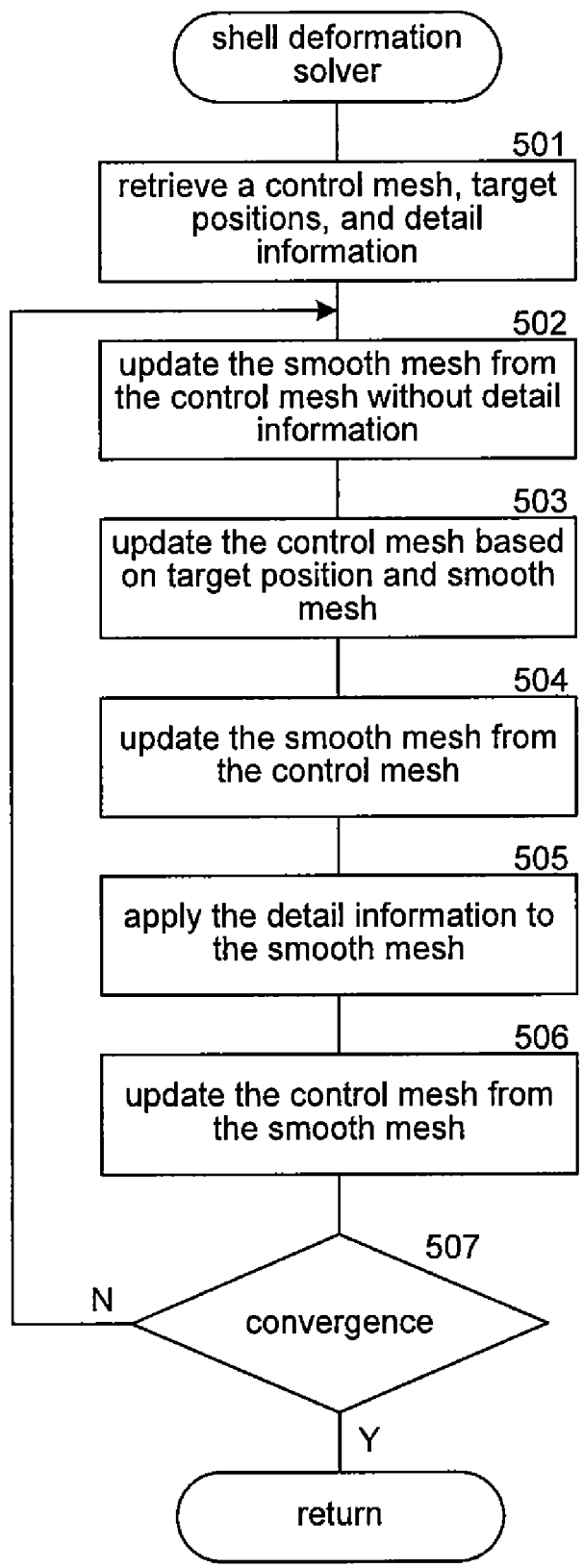
FIG. 5 is a flow diagram that illustrates high-level processing of the shell deformation solver in one embodiment.

FIG. 5 is a flow diagram that illustrates high-level processing of the shell deformation solver in one embodiment. In block 501, the component retrieves the initial control mesh, target positions, and detail information. In blocks 502-507, the component loops calculating a new deformed control mesh until it converges on a solution. In block 502, the component updates a smooth mesh from the control mesh without using detail information. In block 503, the component updates the control mesh based on the target positions and the smooth mesh. In block 504, the component updates the smooth mesh from the control mesh using subdivision. In block 505, the component applies the detail information to the smooth mesh. In block 506, the component updates the control mesh from the smooth mesh that has the detail information applied. In decision block 507, if the control mesh converges on a solution, then the component returns, else the component loops to block 502 to perform the next iteration.

Figure 6:
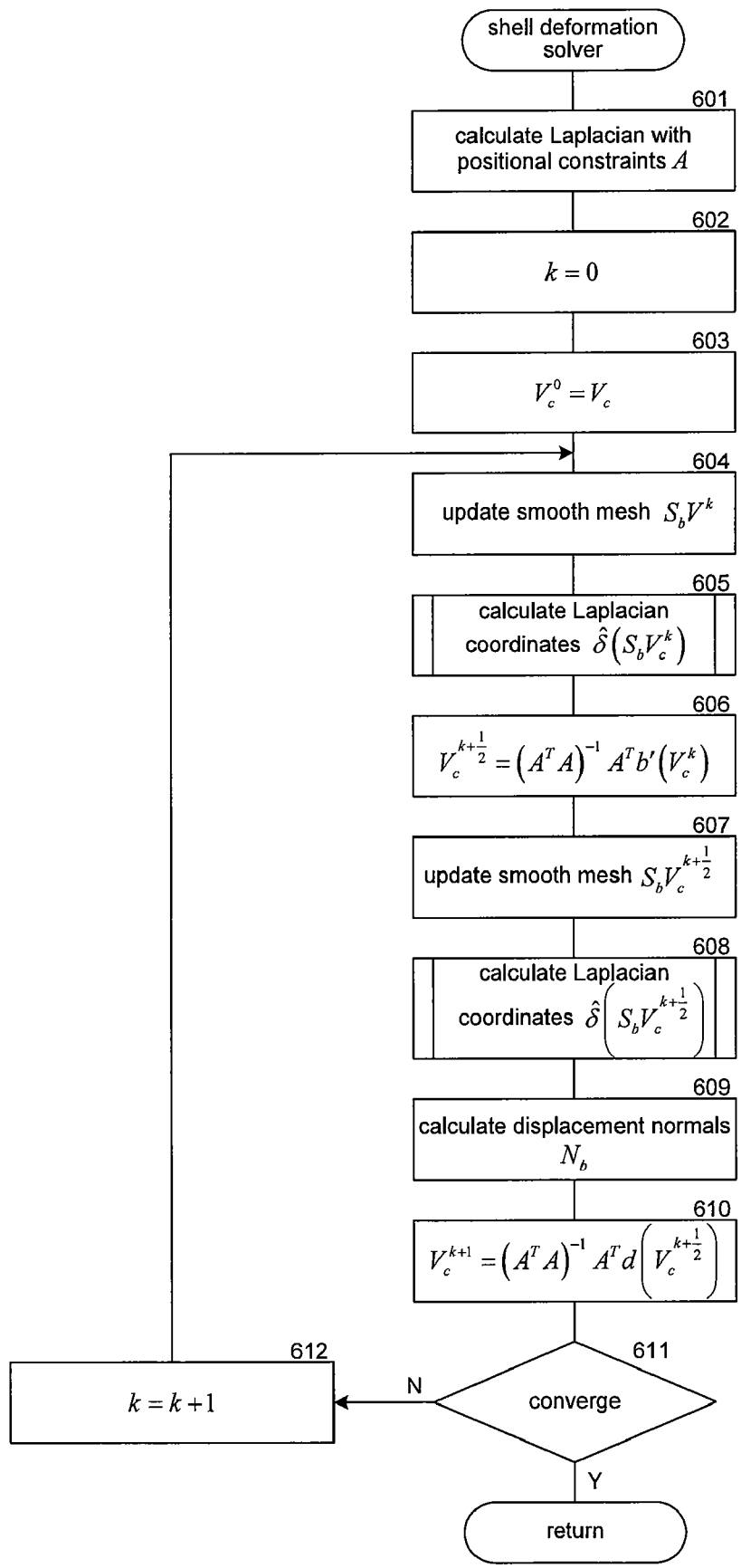
FIG. 6 is a flow diagram that illustrates low-level processing of the shell deformation solver component in some embodiments.

FIG. 6 is a flow diagram that illustrates low-level processing of the shell deformation solver component in some embodiments. In block 601, the component calculates a combined Laplacian operator and positional constraints matrix. In block 602, the component initializes an iteration counter. In block 603, the component initializes the control mesh. In block 604, the component updates the smooth mesh (i.e., replaces it) based on the current control mesh using subdivision. In block 605, the component invokes the calculate Laplacian coordinates component. In block 606, the component updates the control mesh (i.e., replaces it) based on the smooth mesh and the Laplacian coordinates. In block 607, the component updates the smooth mesh from the current control mesh using subdivision. In block 608, the component invokes the calculate Laplacian coordinates component. In block 609, the component calculates the displacement normals for the smooth mesh. In block 610, the component updates the control mesh (i.e., replaces it) using the normals and displacement information. In decision block 611, if the control mesh converges on a solution, then the component returns, else the component continues at block 612. In block 612, the component increments the iteration counter to the next iteration and then loops to block 604 to start the next iteration.

Figure 7:
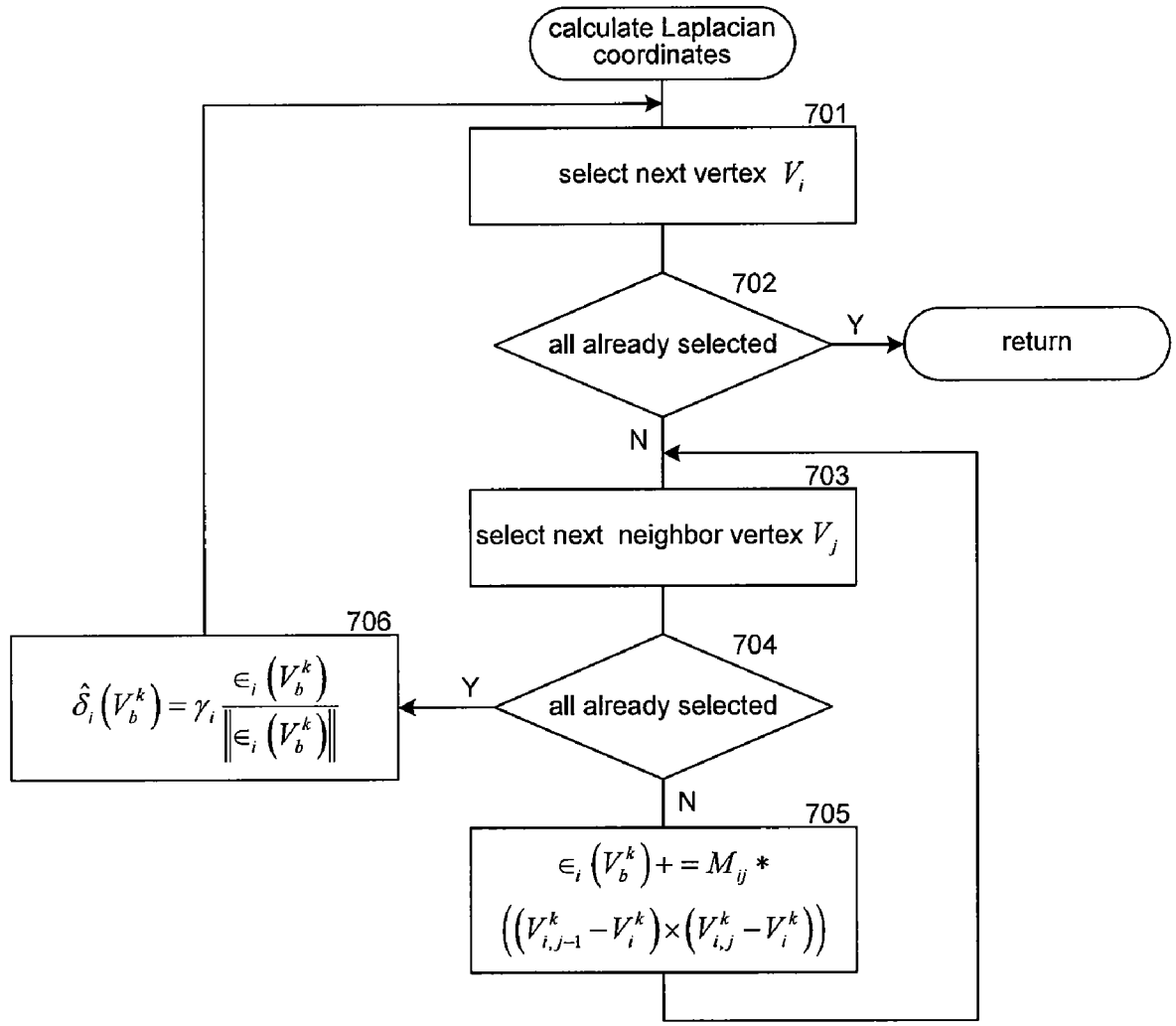
FIG. 7 is a flow diagram that illustrates the processing of the calculate Laplacian coordinates component of the graphics system in some embodiments.

FIG. 7 is a flow diagram that illustrates the processing of the calculate Laplacian coordinates component of the graphics system in some embodiments. The component calculates the Laplacian coordinates using the rotation invariant technique referenced above. The technique uses the Laplacian operator matrix to calculate the Laplacian coordinates before deformation. The technique also calculates coefficients for mapping the un-deformed coordinates to the un-deformed Laplacian coordinates. That mapping is then used to map the deformed coordinates to the deformed Laplacian coordinates. The coefficients and the Laplacian operator matrix are precomputed before the iterations start. In block 701, the component selects the next vertex of a mesh. In decision block 702, if all the vertices have already been selected, then the component returns, else the component continues at block 703. In blocks 703-705, the component loops, accumulating the mapping to Laplacian coordinates from the selected vertex to its neighbor vertices. In block 703, the component selects the next neighbor vertex. In decision block 704, if all the neighbor vertices have already been selected, then the component continues at block 706, else the component continues at block 705. In block 705, the component accumulates the Laplacian coordinates for the selected neighbor vertex and then loops to block 703 to select the next neighbor vertex. In block 706, the component calculates the Laplacian coordinates by multiplying the length of the original Laplacian coordinate and dividing the accumulated coordinates by the number of neighbor vertices and then loops to block 701 to select the next vertex.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. One skilled in the art will appreciate that a document can include any information content that contains links or otherwise identifies other content. For example, a document may be a web page with links to other web pages, a scholarly article with citations to other scholarly articles, a judicial opinion with citations to other judicial opinions, a patent with citations to other patents, and so on. Accordingly, the invention is not limited except as by the appended claims.

We claim:

1. A method in a computing device for generating a control mesh for a subdivision surface being deformed, the method comprising
   establishing vertices of a control mesh, target positions of constrained vertices of detail mesh of the subdivision surface, and detail information; and
   repeating, until the control mesh converges on a solution, steps performed by the computing device comprising:
      updating a smooth mesh from the current control mesh;
      calculating Laplacian coordinates for the smooth mesh;
      updating the control mesh for the deformation based on the Laplacian coordinates and inferred position constraints of the smooth mesh;
      updating the smooth mesh from the control mesh;
      calculating normals for the smooth mesh;
      updating the detail mesh from the smooth mesh, the normals, and the detail information;
      calculating Laplacian coordinates for the detail mesh; and
      updating the control mesh for the deformation based on the Laplacian coordinates, and position constraints of the detail mesh.

2. The method of claim 1 including generating a combined subdivision operator, Laplacian operator and positional constraint matrix that is used when generating the control mesh.

3. The method of claim 1 wherein the updating of the control mesh based on the Laplacian coordinates and the inferred position constraints of the smooth mesh:

$$V_c^{k+\frac{1}{2}} = (A^T A)^{-1} A^T b'(V_c^k).$$

4. The method of claim 1 wherein the updating of the control mesh based on the Laplacian coordinates and the position constraints of the detail mesh is represented by the following:

$$V_c^{k+1} = (D^T D)^{-1} D^T d\left(V_c^{k+\frac{1}{2}}\right).$$

5. The method of claim 3 including calculating $A^T$ and $(A^T A)^{-1}$ and storing them as separate textures on a graphics processing unit that performs the generating of the control mesh.

6. The method of claim 4 including calculating $(A^T A)^{-1} A^T$ and $(D^T D)^{-1}$ and storing them as separate textures on a graphics processing unit that performs the generating of the control mesh.

7. The method of claim 1 wherein the detail information is generated from a displacement map.

8. The method of claim 1 wherein the detail information is generated from a geometric texture.

9. The method of claim 1 wherein position constraints of the smooth mesh are inferred from the position constraints of a detail mesh.

10. The method of claim 1 wherein the target positions of constrained vertices are derived from a user manipulating an image generated from a detail mesh.

11. A computer storage device encoded with instructions for controlling a computing device to generate a control mesh for a subdivision surface being deformed, by a method comprising:
providing vertices of a control mesh, target positions of constrained vertices of a detail mesh of the subdivision surface, and detail information; and
identifying a deformed control mesh based on minimizing an energy function representing Laplacian constraints and positional constraints based on the target positions of the constrained vertices of the detail mesh
wherein the identifying includes updating the control mesh based on inferred position constraints and Laplacian coordinates of the smooth mesh as represented by the following:

$$V_c^{k+\frac{1}{2}} = (A^T A)^{-1} A^T b'(V_c^k).$$

12. The computer storage device of claim 11 including after the identifying the deformed control mesh, displaying a representation of a detail mesh generated from the control mesh.

13. The computer storage device of claim 11 wherein the subdivision surface is a detail mesh generated from a smooth mesh based on a displacement map.

14. The computer storage device of claim 11 wherein the subdivision surface is a detail mesh generated from a smooth mesh based on a geometric texture.

15. A computer storage device encoded with instructions for controlling a computing device to generate a control mesh for a subdivision surface being deformed, by a method comprising:
providing vertices of a control mesh, target positions of constrained vertices of a detail mesh of the subdivision surface, and detail information; and
identifying a deformed control mesh based on minimizing an energy function representing Laplacian constraints and positional constraints based on the target positions of the constrained vertices of the detail mesh wherein the identifying includes updating of the control mesh from the detail mesh as represented by the following:

$$V_c^{k+1} = (D^T D)^{-1} D^T d\left(V_c^{k+\frac{1}{2}}\right).$$

16. A computing device for generating a deformed control mesh for subdivision surface being deformed, comprising
a mesh store having a control mesh with vertices and detail information;
a component that inputs a target position of constrained vertices of the detail mesh; and
a solver component that iteratively generates a deformed control mesh based on a Laplacian deformation and factoring in the target position of the constrained vertices of the detail mesh; and
a component that generates the deformed subdivision surface by generating a deformed smooth mesh from subdividing the deformed control mesh and applying the detail information to the deformed smooth mesh.

17. The computing device of claim 16 including a component that displays a representation of the deformed detail mesh.

18. The computing device of claim 16 wherein the component that inputs the target positions of constrained vertices receives from a user a selection of surface points of a displayed representation of a subdivision surface.

19. The computing device of claim 16 wherein the solver component is implemented using a graphics processing unit.

* * * * *